United States Patent [19]
Kishi

[11] Patent Number: 4,582,035
[45] Date of Patent: Apr. 15, 1986

[54] FUEL SUPPLY CONTROL METHOD FOR MULTICYLINDER INTERNAL COMBUSTION ENGINES

[75] Inventor: Noriyuki Kishi, Tokyo, Japan

[73] Assignee: Honda Giken Kogyo Kabushiki Kaisha, Tokyo, Japan

[21] Appl. No.: 698,637

[22] Filed: Feb. 6, 1985

[30] Foreign Application Priority Data

Feb. 9, 1984 [JP] Japan ................... 59-22268

[51] Int. Cl.$^4$ ........................................ F02M 51/00
[52] U.S. Cl. .................................. 123/478; 123/490
[58] Field of Search ............. 123/478, 480, 486, 487, 123/491, 492, 490; 364/431.05

[56] References Cited

U.S. PATENT DOCUMENTS 4,229,793 10/1980 Yoshida et al. ............. 123/486 X

FOREIGN PATENT DOCUMENTS 38657 9/1971 Japan .
56762 12/1974 Japan .
52537 5/1981 Japan ........................... 123/490

*Primary Examiner*—Tony M. Argenbright
*Attorney, Agent, or Firm*—Lyon & Lyon

[57] ABSTRACT

A fuel supply control method for multicylinder internal combustion engines, includes calculating the quantity of fuel being supplied to the engine in response to operating conditions of the engine, and sequentially supplying quantities of fuel corresponding to the calculated values into respective corresponding ones of the cylinders. The fuel quantity is calculated in synchronism with generation of pulses of a timing signal equal in number to the number of the cylinders at predetermined crank angles of the engine per one cycle of the engine. When a calculation started upon generation of an immediately preceding pulse of the timing signal is completed before a present pulse of the timing signal is generated, the supply of fuel is started in a quantity corresponding to a calculated value obtained by the same calculation, immediately upon completion of the calculation, whereas when the present pulse of the timing signal is generated before completion of the calculation started upon generation of the immediately preceding pulse of the timing signal, the supply of fuel is started in a quantity corresponding to a calculated value obtained by a latest calculation effected before the generation of the present pulse of the timing signal, immediately upon the generation of the present pulse of the timing signal, thereby minimizing fluctuations in the air-fuel ratio at transition from a low engine speed region to a high engine speed region and vice versa.

3 Claims, 7 Drawing Figures

| FIG.7A | FIG.7B |

FUEL SUPPLY CONTROL METHOD FOR MULTICYLINDER INTERNAL COMBUSTION ENGINES

BACKGROUND OF THE INVENTION

This invention relates to a fuel supply control method for multicylinder internal combustion engines, and more particularly to a control method of this kind which is adapted to control the sequence of fuel injections into engine cylinders at high speed operation of the engine in particular.

A fuel supply control method for multicylinder internal combustion engines has generally been employed, which comprises successively calculating the quantity of fuel to be supplied to the engine to values dependent upon operating conditions of the engine, in synchronism with generation of pulses of a crank angle signal sequentially generated at predetermined crank angles of the engine, and successively supplying the calculated quantities of fuel to the engine cylinders in predetermined sequence.

According to such conventional sequential fuel supply method, when the engine speed is low, the time interval between adjacent pulses of the crank angle signal sequentially generated is larger than the maximum possible time required for calculating the fuel quantity such that even if the calculation is started upon generation of each pulse of the crank angle signal and the supply or injection of the calculated quantity of fuel is started immediately after completion of the calculation, almost all the fuel thus supplied is sucked into the corresponding cylinder. Thus, in a low engine speed region, a required air-fuel ratio and accordingly required driveability of the engine can be achieved with the conventional method.

However, when the engine speed is so high that the time interval between adjacent pulses of the crank angle signal sequentially generated is very close to the maximum possible calculating time, the injection timing will be too late relative to the timing of the suction stroke of the corresponding cylinder if the fuel injection is started after completion of the calculation, failing to positively achieve a required air-fuel ratio and accordingly required engine driveability.

To overcome this disadvantage, there have been proposed a method of decreasing the frequency of calculation of the fuel quantity, for instance, effecting the calculation one time per several pulses of the crank angle signal sequentially generated during high speed operation of the engine, and then injecting the calculated quantity of fuel into two cylinders in a group of two groups at the same time or into all the four cylinders at the same time in the case of a four cylinder engine (Japanese Patent Publications Nos. 47-38657 and 49-45652), and a method of holding fuel injection immediately after completion of the calculation, and starting the fuel injection of the calculated quantity into the corresponding cylinder upon generation of a crank signal pulse after execution of one cycle of the cylinder, thus continually effecting sequential injection in a high engine speed region as in a low engine speed region.

However, according to the former proposed method, there can occur a large time lag, particularly in simultaneous injection into all the four cylinders, between the completion of the calculation and the start of fuel injection, thus suffering from low responsiveness to changes in the operating condition of the engine and accordingly degraded engine driveability. On the other hand, according to the latter proposed method, upon changeover of the injection manner at transition from the low engine speed region to the high engine speed region, there can occur a large change in the injection timing relative to the suction stroke of the cylinder(s), leading to fluctuations in the air/fuel ratio and accordingly degraded engine driveability. That is, referring to FIG. 1 showing the latter proposed method, if in the low engine speed region a calculation CAL is started upon generation of a pulse of the crank angle signal corresponding to a cylinder #1 [(b) of FIG. 1] and injection of the calculated quantity of fuel is started immediately upon completion of the calculation, the injection starting timing will become delayed relative to the cylinder suction stroke as the engine speed becomes higher [(c) of FIG. 1], resulting in that only part Q1 of the injection fuel is actually sucked into the cylinder #1, while the remainder of the injected fuel remains within the intake pipe and is sucked into the next cylinder during the suction stroke thereof. That is, a fuel quantity Q'2 remaining in the intake pipe at the suction stroke of a preceding cylinder (nearly equal to the remaining fuel quantity Q2) is sucked into a present cylinder together with a fuel quantity Q1 just injected. Therefore, so long as the engine is operating at a constant speed, almost the same fuel quantity Q is sucked into each of the cylinders, and thus neither air-fuel ratio fluctuation nor degradation of the engine driveability takes place. On the other hand, upon transition from the low engine speed region to the high engine speed region, as shown at (d) in FIG. 1, fuel injection into each cylinder is started upon generation of a crank angle signal pulse T1 after execution of one cycle of the cylinder from the completion of the calculation for the cylinder, that is, the injection timing is largely retarded relative to the starting time of an immediately preceding fuel injection as shown at (c) in FIG. 1. In addition, all of a fuel quantity Q obtained by the immediately preceding calculation CAL and now injected upon generation of the pulse T1 and a fuel quantity Q2 remaining unsucked in the intake pipe at the immediately preceding injection are sucked together into the cylinder #1, suddenly overriching the air-fuel ratio and accordingly causing a sudden change in the engine speed, i.e. operating shock, or temporary degradation in the driveability.

SUMMARY OF THE INVENTION

It is an object of the invention to provide a fuel supply control method for multicylinder internal combustion engines, which employs a sequential fuel supply method, and is capable of minimizing fluctuations in the air-fuel ratio at transition from a low engine speed region to a high engine speed region and vice versa, thereby preventing operating shock of the engine.

It is another object of the invention to provide a fuel supply control method of this kind which is capable of supplying in an accurate manner a calculated quantity of fuel into each one of the cylinders of the engine particularly in a high engine speed region.

The present invention provides a fuel supply control method for an internal combustion engine having a plurality of cylinders, including calculating the quantity of fuel to be supplied to the engine in response to operating conditions of the engine, and sequentially supplying quantities of fuel corresponding to the calculated values into respective corresponding ones of the cylinders.

The method according to the invention is characterized by comprising the steps of: (a) generating pulses of a timing signal equal in number to the number of the cylinders at predetermined crank angles of the engine per one cycle of the engine; (b) calculating the quantity of fuel to be supplied to the engine, in synchronism with generation of the timing signal; (c) when a calculation started in the step (b) upon generation of an immediately preceding pulse of the timing signal is completed before a present pulse of the timing signal is generated, starting the supply of fuel in a quantity corresponding to a calculated value obtained by the same calculation, immediately upon completion of the calculation; and (d) when the present pulse of the timing signal is generated before completion of the calculation started in the step (b) upon generation of the immediately preceding pulse of the timing signal, starting the supply of fuel in a quantity corresponding to a calculated value obtained by a latest calculation effected in the step (b) before the generation of the present pulse of the timing signal, immediately upon the generation of the present pulse of the timing signal.

Preferably, when the present pulse of the timing signal is generated before completion of the calculation started in the step (b) upon generation of the immediately preceding pulse of the timing signal, the calculation started upon the generation of the immediately preceding pulse is continually executed, while a further calculation is inhibited even with the generation of the present pulse of the timing signal.

Further preferably, immediately upon generation of a pulse of the timing signal next to the present pulse after completion of the above continually executed calculation, the supply of fuel is started in a quantity corresponding to a calculated value obtained by the continually executed calculation completed.

The above and other objects, features and advantages of the invention will be more apparent from the ensuing detailed description taken in conjunction with the accompanying drawings.

DETAILED DESCRIPTION

The method according to the invention will now be described in detail with reference to the drawings.

Figure 1:
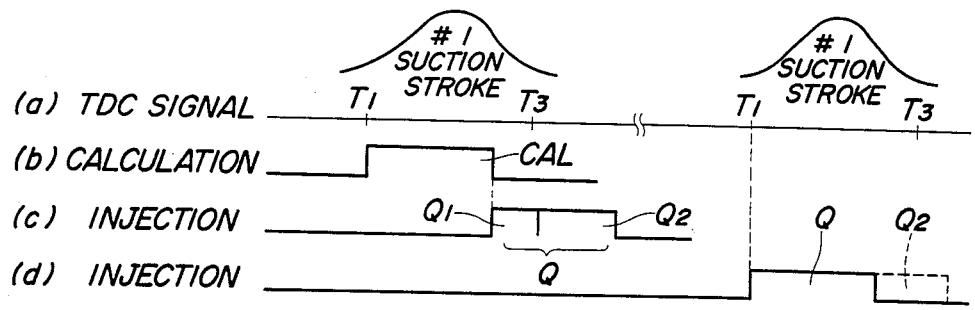
FIG. 1 is a timing chart showing the timing relationship between generation of TDC signal, calculation and injection according to a conventional fuel injection control method.
Figure 2:
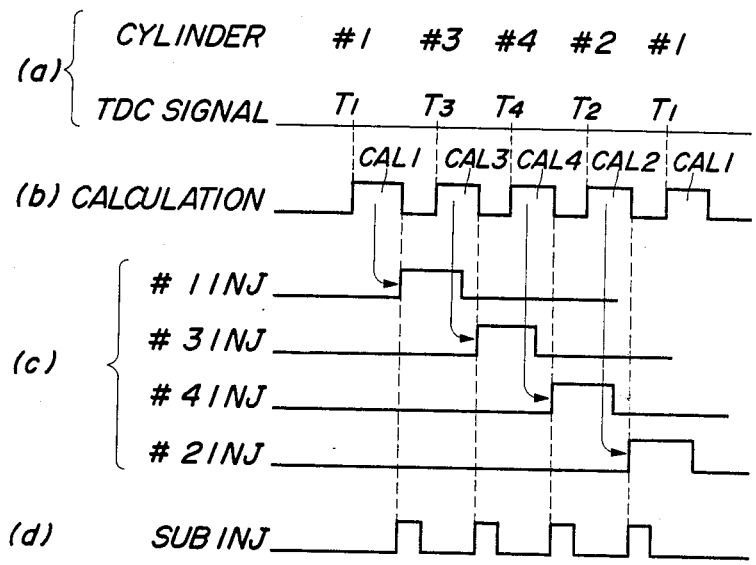
FIG. 2 is a timing chart showing an injection manner according to the present invention, applicable during engine operation in a low engine speed and steady operating condition.

Referring first to FIG. 2, an injection manner according to the present invention is shown, which is applicable during engine operation in a low engine speed and steady operating condition. A calculation of the fuel quantity is effected each time one of sequential pulses of a crank angle signal (hereinafter called "the TDC signal") is generated with rotation of the engine. Immediately upon completion of the calculation, an injection into one of engine cylinders is started, which lasts for a period of time corresponding to the calculated value. Thereafter, similar calculations and injections to the above are carried out with respect to the other cylinders, thus performing sequential injection. More specifically, calculations CAL1, CAL3, CAL4, and CAL2 are started [(b) in FIG. 2], respectively, when pulses T1, T3, T4, and T2 of the TDC signal are generated per one cycle of the engine as shown at (a) in FIG. 2, and injections of the calculated quantities of fuel are effected sequentially into the engine cylinders through respective injectors INJ #1, INJ #3, INJ #4, and INJ #2 immediately upon completion of the respective calculations. While the engine is operating in a low engine speed and steady operating condition, this basic sequential calculation and injection is directly effected without modification, into all the engine cylinders.

Figure 3:
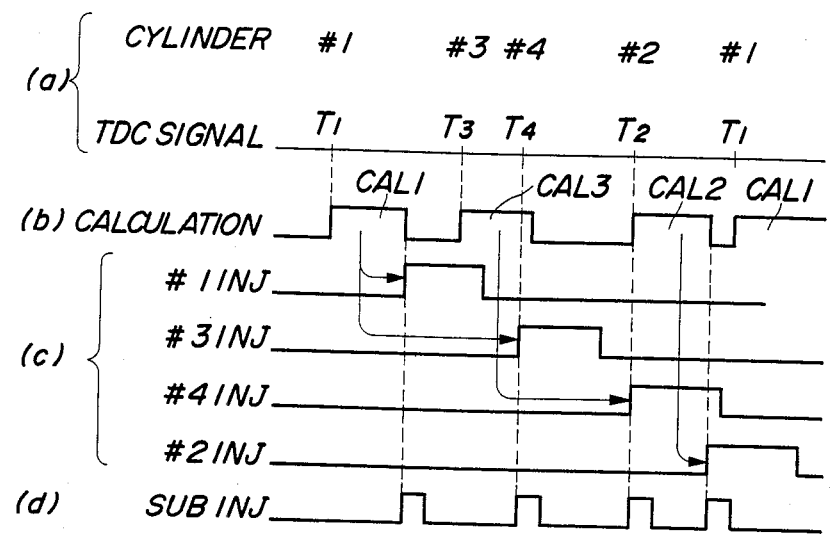
FIG. 3 is a timing chart showing an injection manner according to the present invention, applicable during engine operation in a low engine speed region wherein the engine speed changes.

Referring next to FIG. 3, another injection manner according to the present invention is shown, which is applicable when the engine speed suddenly rises during calculation of the fuel injection quantity according to the FIG. 2 injection manner in the low engine speed region. According to the FIG. 3 manner, when a pulse of the TDC signal is generated during a present calculation of the fuel injection quantity, an injection is started into a corresponding cylinder using a calculated quantity value obtained last time, immediately upon the generation of the above TDC signal pulse. Even when the present calculation is completed immediately after the above injection, an injection into the next cylinder is not effected immediately. For example, referring to FIG. 3, in the event that during a calculation CAL3 started upon generation of a TDC signal pulse T3 the engine speed rises so that a next TDC signal pulse T4 is generated before completion of the calculation CAL3, an injection is effected into a corresponding cylinder #3 using a calculated value obtained by an immediately preceding calculation CAL1 which was started upon generation of a preceding TDC signal pulse T1. Even when the calculation CAL3 is completed immediately after the start of the injection into the cylinder #3, a next injection into a cylinder #4 is not effected immediately, but it is effected immediately upon generation of a next TDC signal pulse T2. Then, immediately upon the generation of the TDC signal pulse T2 a regular calculation CAL2 is started. If no TDC signal pulse is generated during the calculation CAL2, an injection is effected into a cylinder #2 immediately upon completion of the calculation CAL2.

Figure 4:
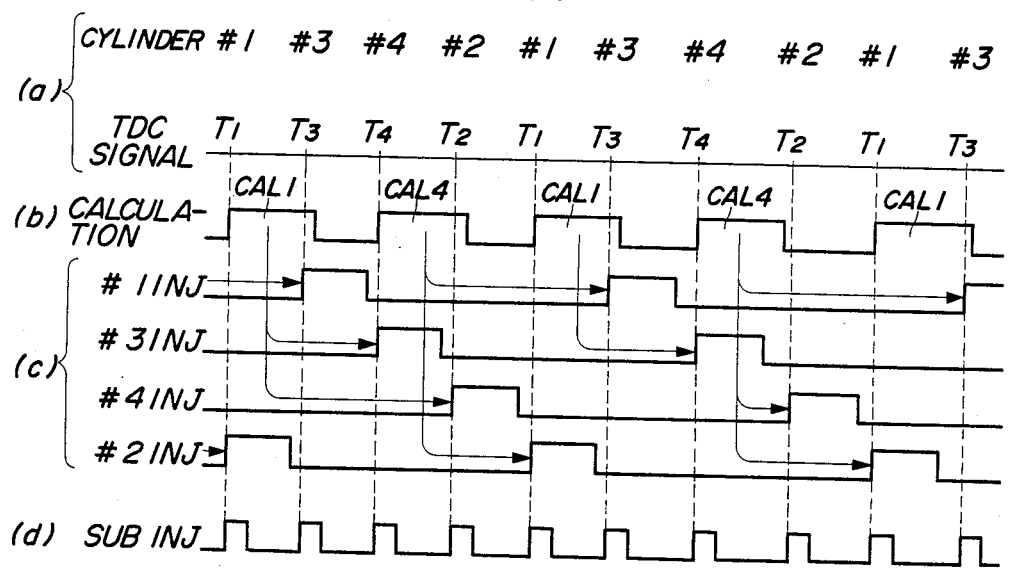
FIG. 4 is a timing chart showing an injection manner according to the present invention, applicable during engine operation in a high engine speed region.

FIG. 4 shows an injection manner according to the method of the invention, which is applicable in the event that TDC signal pulses are continually generated before respective calculations of the fuel injection quantity are finished, such as during engine operation in a high engine speed region. According to this manner, a calculation is always effected upon generation of every other TDC signal pulse, and an injection is effected using a calculated value obtained by the same calculation, immediately upon generation of a TDC signal pulse generated immediately after completion of the same calculation, as distinct from the FIG. 2 and FIG. 3 manners wherein a calculation is effected upon generation of every TDC signal pulse insofar as no preceding calculation is then being executed. According to the illustrated example of FIG. 4, first a calculation CAL1 is started immediately upon generation of a TDC signal pulse T1, while an injection is started into a cylinder #2 immediately upon the generation of the same TDC signal pulse T1, using a calculated value obtained immediately before the generation of the pulse T1 (the calculation time of which is not shown). If a next TDC signal pulse T3 is generated during execution of the calculation CAL1, an injection into a cylinder #1 is started using the above-mentioned immediately preceding calculated value, immediately upon the generation of the TDC signal pulse T3, while continuing the calculation CAL1. Then, when a next TDC signal pulse T4 is generated after completion of the calculation CAL1, an injection is started into a cylinder #3 immediately upon the generation of the pulse T4 and using a calculated value resulting from the calculation CAL1. At the same time, the generation of the pulse T4 causes starting a next calculation CAL4. When a further TDC signal pulse T2 is generated during execution of the calculation CAL4, an injection is effected into a cylinder #4, using the calculated value of the calculation CAL1, while a calculated value resulting from the calculation CAL4 is used for injection into a cylinder #2 immediately upon generation of a further TDC signal pulse T1.

In this way, a sequential injection is carried out even when the engine is operating in a high engine speed region (quasi-sequential injection).

Figure 5:
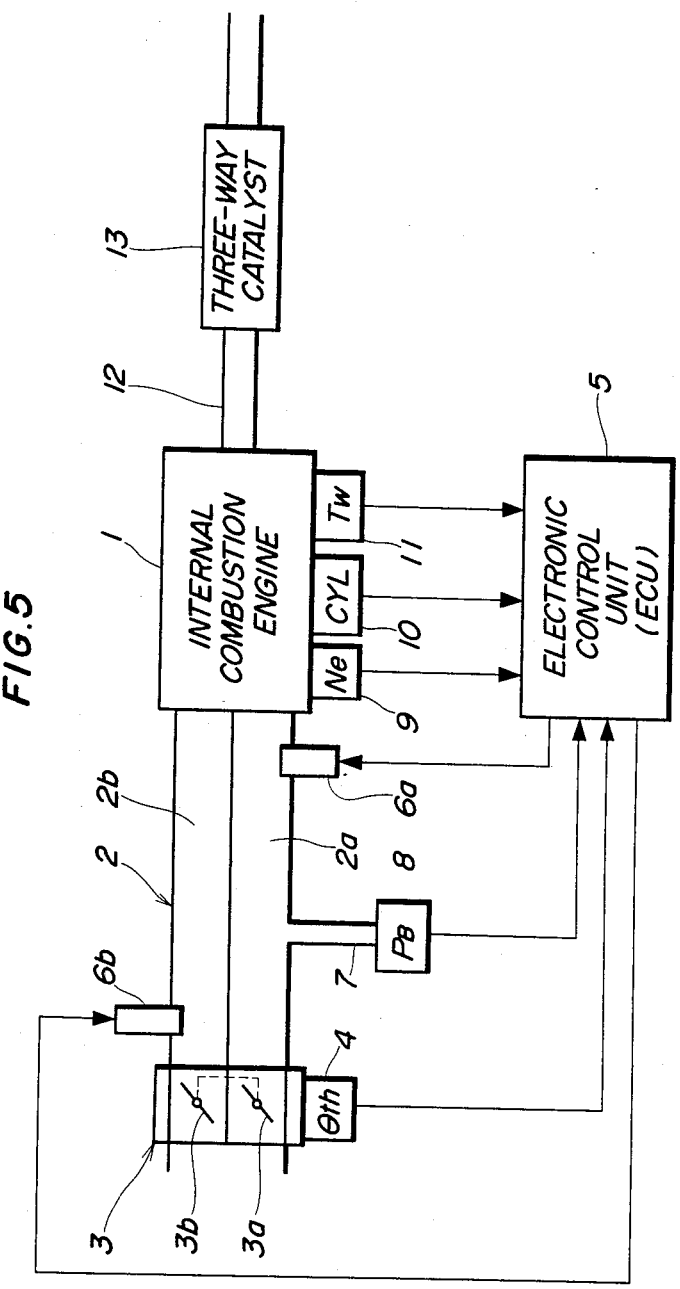
FIG. 5 is a block diagram showing the whole arrangement of a fuel supply control system for an internal combustion engine, to which is applied the method according to the present invention.

FIG. 5 illustrates the whole arrangement of a fuel supply control system to which is applied the method according to the present invention. Reference numeral 1 designates an internal combustion engine which may be a four-cylinder type, for instance. The engine 1 has main combustion chambers which may be four in number and sub combustion chambers communicating with the respective main combustion chambers, none of which are shown. An intake pipe 2 is connected to the engine 1, which comprises a main intake pipe 2a communicating with each main combustion chamber, and a sub intake pipe 2b communicating with each sub combustion chamber. Arranged across the intake pipe 2 is a throttle body 3 which accommodates a main throttle valve 3a and a sub throttle valve 3b mounted in the main intake pipe and the sub intake pipe, respectively, for synchronous operation of controlling the opening area of the respective intake pipes. A throttle valve opening sensor 4 is connected to the main throttle valve 3a for detecting its valve opening and converting same into an electrical signal which is supplied to an electronic control unit (hereinafter called "the ECU") 5. Main injectors 6a and a sub injector 6b are arranged in the main intake pipe 2a and the sub intake pipe 2b, respectively. The main injectors 6a correspond in number to the engine cylinders and are each arranged in the main intake pipe 2a at a location slightly upstream of an intake valve, not shown, of a corresponding engine cylinder, while the sub injector 6b, which is single in number, is arranged in the sub intake pipe 2b at a location slightly downstream of the sub throttle valve, for supplying fuel to all the engine cylinders. The main injectors 6a and the sub injector 6b are electrically connected to the ECU 5 in a manner having their valve opening periods or fuel injection quantities controlled by driving signals supplied from the ECU 5, while they are connected to a fuel pump, not shown, to be supplied with pressurized fuel therefrom.

On the other hand, an absolute pressure sensor 8 communicates through a conduit 7 with the interior of the main intake pipe 2a at a location immediately downstream of the main throttle valve 3a, for detecting absolute pressure in the main intake pipe 2a and supplying an electrical signal indicative of detected absolute pressure to the ECU 5. An engine speed sensor (hereinafter called "the Ne sensor") 9 and a cylinder-discriminating sensor (hereinafter called "the CYL sensor") 10 are arranged in facing relation to a camshaft, not shown, of the engine 1 or a crankshaft of same, not shown. The former 9 is adapted to generate one pulse of a crank angle signal or TDC signal at one of predetermined crank angles each time the engine crankshaft rotates through 180 degrees, while the latter 10 is adapted to generate one pulse at a particular crank angle of a particular engine cylinder. The pulses generated by these sensors 9, 10 are also supplied to the ECU 5.

An engine temperature sensor (hereinafter called "the TW sensor") 11 is mounted on the main body of the engine 1 for detecting the engine temperature, for instance the temperature of engine cooling water TW, while an intake-air temperature sensor, not shown, is arranged in the main intake pipe 2a for detecting the intake air temperature. These sensors are also electrically connected to the ECU 5 for supplying electrical signals indicative of detected engine temperature and intake air temperature thereto. A three-way catalyst 13 is arranged in an exhaust pipe 12 extending from the main body of the engine 1 for purifying ingredients HC, CO, and NOx contained in the exhaust gases. An $O_2$ sensor, not shown, is inserted in the exhaust pipe 12 at a location upstream of the three-way catalyst 13 for detecting the concentration of oxygen in the exhaust gases and supplying an electrical signal indicative of a concentration value to the ECU 5.

Further electrically connected to the ECU 5 are a sensor for detecting atmospheric pressure and a starter switch for actuating the engine starter, and a battery for power supply, for supplying electrical signals indicative of detected atmospheric pressure, on-off positions of the starter switch and the battery voltage to the ECU 5.

The ECU 5 is responsive to the engine operating parameter signals supplied from the above-mentioned various sensors to calculate the fuel injection periods TOUTM and TOUTS for the main injectors 6a and the sub injector 6b, by the use of the following equations:

$$TOUTM = TiM \times K1 + K2 \qquad (1)$$

$$TOUTS = TiS \times K'1 + K'2 \qquad (2)$$

where TiM and TiS are basic fuel injection periods for the main injectors 6a and the sub injector 6b, respectively, which are read from a storage means within the ECU 5 on the basis of detected intake pipe absolute pressure PB and engine rotational speed Ne, for instance. K1, K2 K'1 and K'2 represent correction coefficients and correction terms which are determined by calculations using respective equations, etc. on the basis of the values of engine operating parameter signals supplied from various sensors such as throttle valve opening sensor 4, intake pipe absolute pressure sensor 8, Ne sensor 9, TW sensor 11, $O_2$ sensor, intake-air temperature sensor, and atmospheric pressure sensor, so as to optimize various characteristics of the engine such as startability, emissions, fuel consumption, and accelerability.

The ECU 5 operates on the calculated fuel injection periods for TOUTM, TOUTS to supply the ECU 5 with driving signals for opening the main injectors 6a and the sub injector 6b. The sub injector 6b is opened in synchronism with opening of each of the main injectors 6a, as shown in FIGS. 2 through 4 referred to before.

Figure 6:
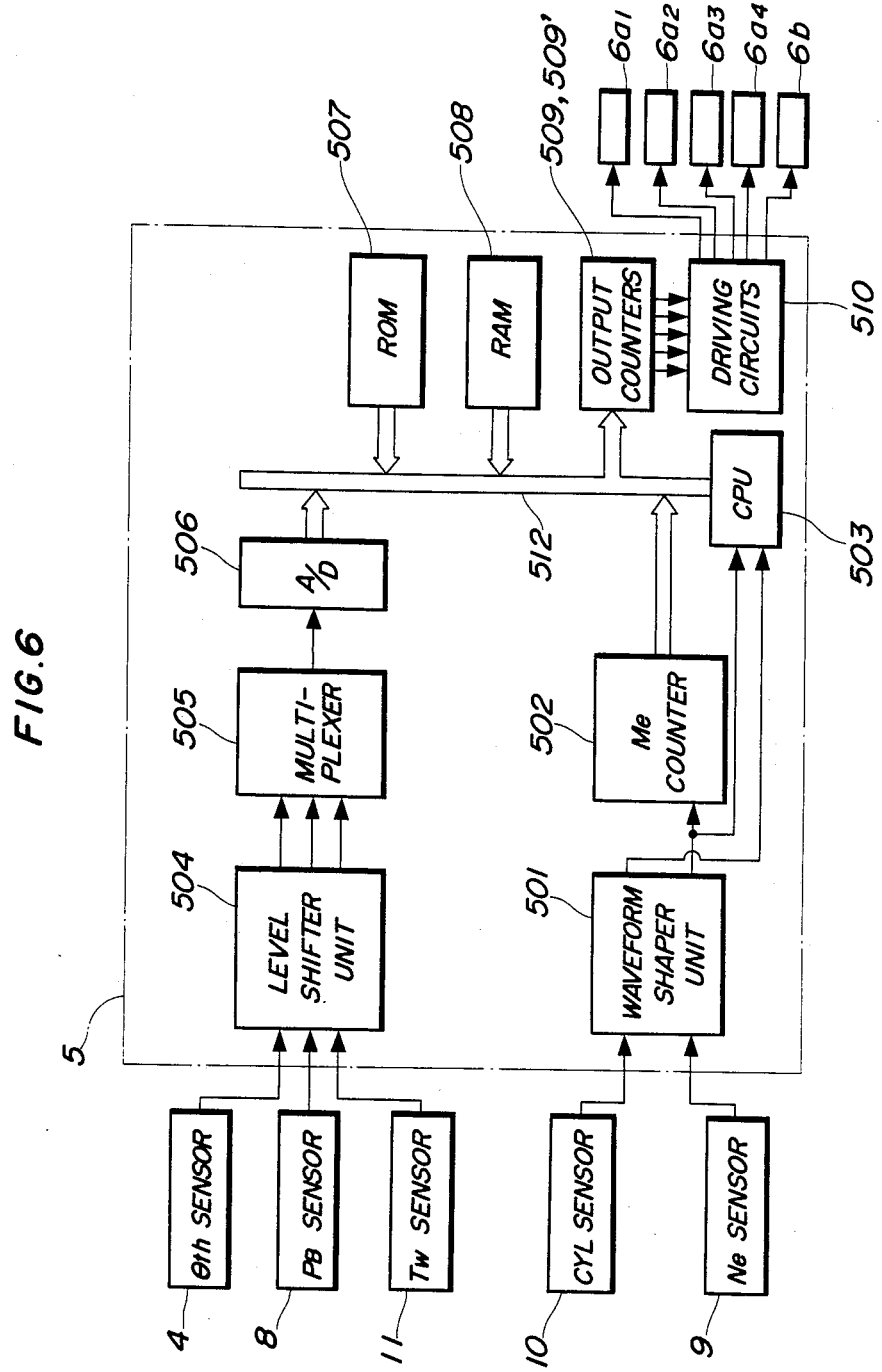
FIG. 6 is a block diagram showing an example of the interior construction of an electronic control unit appearing in FIG. 5.

FIG. 6 shows a circuit configuration within the ECU 5 in FIG. 5. An output signal the Ne sensor 9 in FIG. 5 is applied to a waveform shaper unit 501, wherein its pulse waveform is shaped, and the shaped signal is successively supplied to a central processing unit (hereinafter called "the CPU") 503, as well as to an Me counter 502, as the TDC signal. The Me counter 502 counts the time interval between a preceding pulse of the TDC signal and a present pulse of the same signal, inputted thereto from the Ne sensor 9. Therefore, its counted value Me corresponds to the reciprocal of the actual engine rotational speed Ne. The Me counter 502 supplies the counted value Me to the CPU 503 via a data bus 512. Output pulses from the CYL sensor 10 are also shaped by the waveform shaper unit 501, and the shaped pulses are applied to the CPU 503.

The respective output signals from the throttle valve opening sensor 4, the intake pipe absolute pressure sensor 8, the TW sensor 11, and other engine operating parameter sensors, not shown, have their voltage levels shifted to a predetermined voltage level by a level shifter unit 504 and successively applied to an analog-to-digital converter 506 through a multiplexer 505. The analog-to-digital converter 506 successively converts into digital signals analog output voltages from the aforementioned various sensors, and the resulting digital signals are supplied to the CPU 503 via the data bus 512.

Further connected to the CPU 503 via the data bus 512 are a read-only memory (hereinafter called "the ROM") 507, a random access memory (hereinafter called "the RAM") 508, a counter 509 for injection through the main injector 6a (6a1-6a4), a counter 509' for injection through the sub injector 6b, and a driving unit 510, the counters 509, 509' being formed by down counters. The RAM 508 temporarily stores various calculated values from the CPU 503, while the ROM 507 stores a control program to be executed within the CPU 503, Ti maps of basic fuel injection periods for the main injectors 6a and the sub injector 6b, values of the aforementioned correction coefficients and correction terms, etc. The CPU 503 executes the control program stored in the ROM 507 to calculate the fuel injection periods TOUTM, TOUTS for the injectors in response to the various engine operating parameter signals and by the use of the aforementioned equations (1), (2), and supplies the calculated period values to the counters 509, 509' via the data bus 512. The calculation of the fuel injection period for the main injectors and application of the calculated value to the counter 509 are effected in manners explained hereinbefore with reference to FIGS. 2 through 4. The counters 509, 509' start counting operations upon being supplied with respective starting command signals from the CPU 503 after having been loaded with the calculated period values from the CPU 503, and at the same time start generating output signals until their counts are reduced to zero. The driving unit 510 continually generates driving signals to selectively open the main injectors 6a1-6a4 as well as to open the sub injector 6b, as long as it is supplied with respective output signals from the counters 509, 509'. As mentioned above, the sub injector 6b is supplied with a driving signal for opening same in synchronism with supply of driving signals to the main injectors 6a. In FIG. 6, omitted is illustration of a data address bus and a control bus connecting between the CPU 503 and the Me value counter 502, the analog-to-digital converter 506, the ROM 507, the RAM 508, and the counters 509, 509'.

Figure 7A:
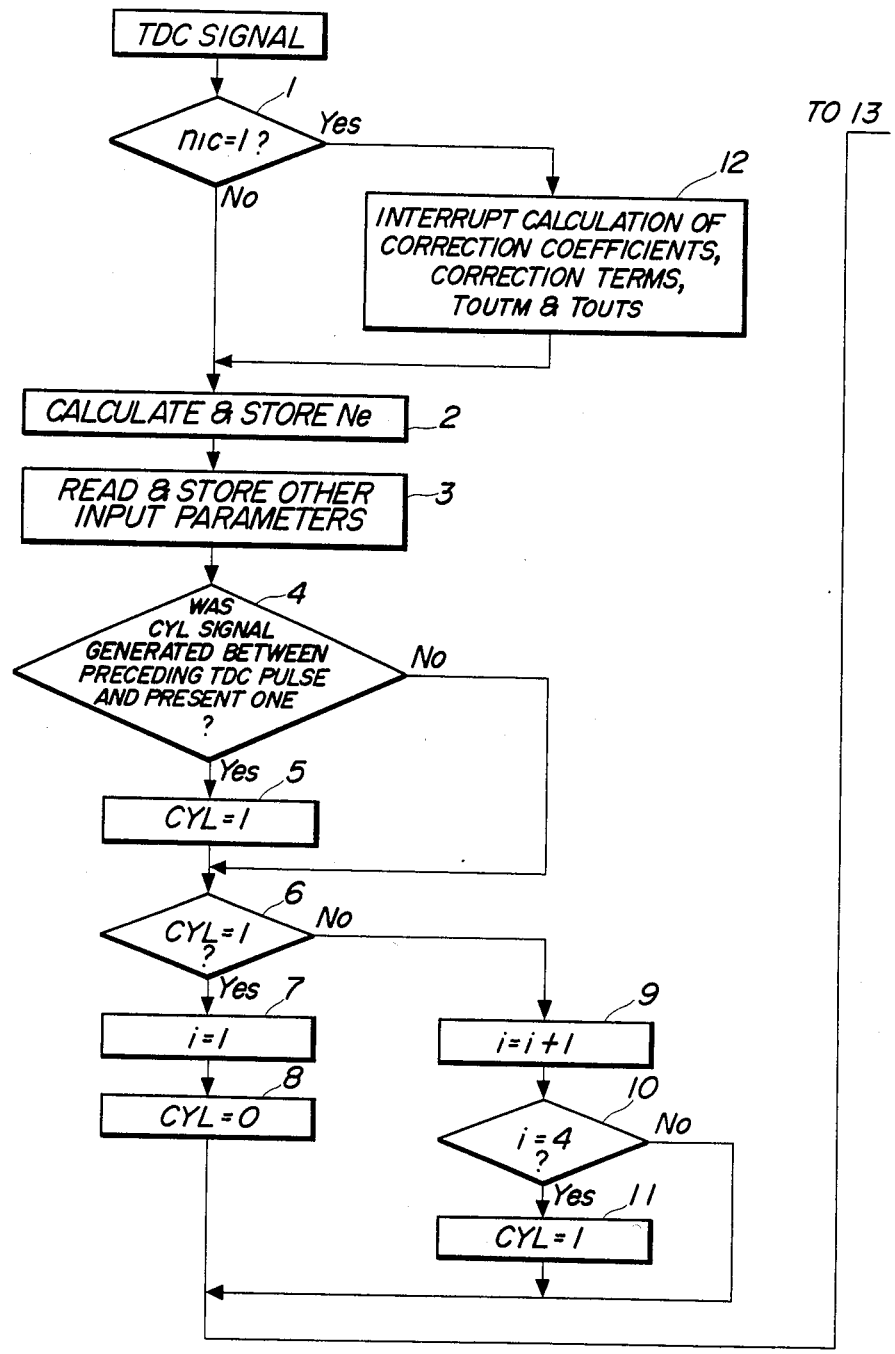
FIG. 7 is a flowchart showing a program for carrying out the method according to the present invention.
Figure 7:
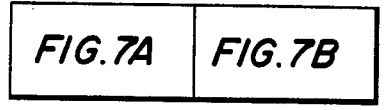
Figure 7B:
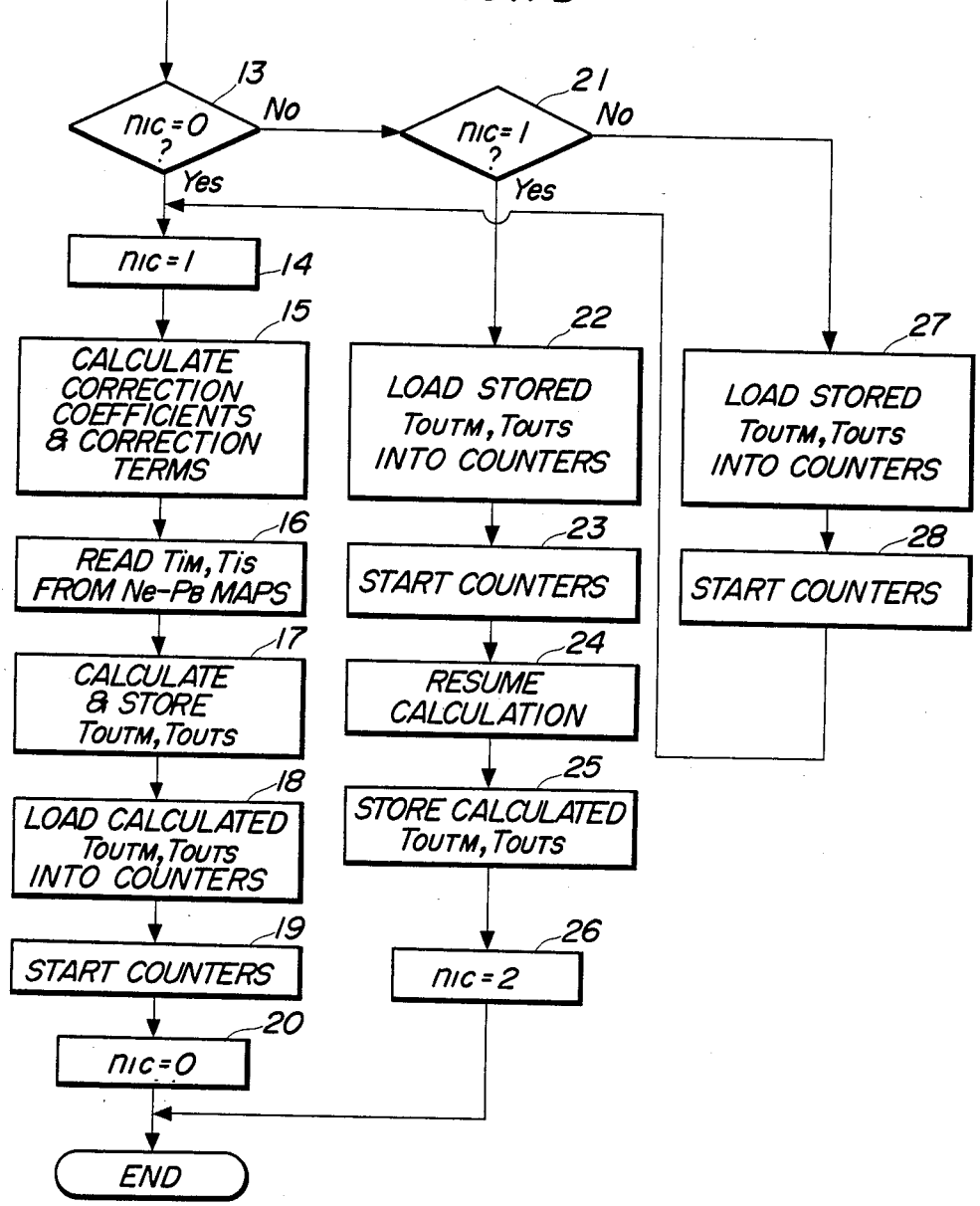

FIG. 7 shows a subroutine forming main part of the control program and for executing the fuel supply control according to the method of the invention. First, it is determined at step 1 whether or not a flag NIC assumes a value of 1, each time a TDC signal pulse is generated. The flag NIC is set to or held at 0 at the time of initialization of the CPU 503 in FIG. 6 and during engine operation in a low engine speed region, while it is held at 1 while the CPU 503 executes calculations such as calculation of the fuel injection period TOUTM, TOUTS, that is, it is held at 1 even if the calculation is interrupted by inputting of a TDC signal pulse, and on the other hand, it is set to 2 when a calculated value of a calculation interrupted and resumed is stored into the RAM 508 in FIG. 6, as hereinafter described. If the answer to the question of step 1 is negative or no, that is, if the flag NIC shows a value other than 1, the engine rotational speed or rpm Ne is measured at step 2, and the measured Ne value is stored into the RAM 508, and at the same time input values of other parameters such as throttle valve opening $\theta$th, intake pipe absolute pressure PB, and engine temperature TW are read and stored into the RAM 508, at step 3. Then, it is determined at step 4 whether or not the cylinder-discriminating signal was generated between generation of an immediately preceding pulse of the TDC signal and a present pulse of same. If the answer is yes, a flag CYL for cylinder discrimination is set to 1 at step 5, while if the answer is no, the program jumps to step 6 wherein it is determined whether or not the flag CYL shows 1. If the answer to the question of step 6 is yes, a flag i is set to a value of 1 corresponding to a cylinder #1 to thus decide that a present injection is to be effected into the cylinder #1, while the flag CYL is reset to 0 at step 8, followed by the program proceeding to step 13. If the answer to the question of step 6 is negative, 1 is added to the value of the flag i indicative of the cylinder into which an immediately preceding injection was effected (step 9), to thus determine the cylinder to be supplied with fuel in the present loop. It is then determined at step 10 whether or not the flag i shows a value of 4 (in a four-cylinder engine), that is, the injecting cylinder is the last one of the four cylinders in one cycle of the engine. If the answer is yes, the cylinder-discriminating flag CYL is set to 1 at step 11, and the program proceeds to step 13, while if the answer is no, the program jumps from step 10 to step 13. In this way, the cylinder into which the present injection is to be effected is determined by the steps 4–11.

In step 13, a determination is made as to whether or not the flag NIC is 0. If the answer is yes, that is, if the engine is operating in the low engine speed region, the flag NIC is set to 1 at step 14, and then in step 15 the values of the correction coefficients and correction terms are calculated on the basis of the engine operating parameter values read in the step 3, while step 16 is executed wherein reading is made of values of the basic fuel injection periods TiM, TiS from the Ne-PB maps stored in the ROM 507 in FIG. 6, on the basis of the engine rotational speed Ne and the intake pipe absolute pressure PB. Then, based upon the read TiM and TiS values and the calculated values of correction coefficients and correction terms, calculations are executed of the main injection period TOUTM and the sub injection period TOUTS, by the use of the aforementioned equations (1), (2), and the calculated period values are stored into the RAM 508 in FIG. 6, at step 17.

Data corresponding to the TOUTM, TOUTS values calculated at step 17 are loaded into the counters 509, 509' at step 18, and simultaneously the counters are started at step 19, while the flag NIC is reset to 0 at step 20. Simultaneously upon starting the counters fuel injections take place to supply fuel into the cylinder determined by the steps 4–11 through the counter 509, while simultaneously supplying fuel for all the cylinders through the counter 509'. Hereinafter description is principally omitted with respect to the injection through the sub injector. The flag NIC set to 1 at step 14 is held at 1 all the time during calculations of the fuel injection periods TOUTM, TOUTS, and is reset to 0 upon the start of the fuel injections, at step 20. The flag NIC is also set to 1 when a TDC signal pulse interrupts the fuel quantity calculation, as hereinafter described.

In the above stated manner, when the engine is operating in the low engine speed region, fuel is sequentially injected into the cylinders by executing the steps 1–20.

Next, if in step 1 the flag NIC is determined to be 1, that is, if a TDC signal pulse was generated during execution of steps 15–17 to calculate the correction coefficients and correction terms and the fuel injection periods TOUTM, TOUTS in the last loop, the program returns to step 1 to execute same. On this occasion, since the flag NIC has been set to 1 at step 14 as noted above, the answer to step 1 becomes yes, and accordingly the calculation(s) then being executed is interrupted at step 12, followed by execution of step 2. Thereafter, steps 3–13 are executed in the same manner as described above.

In step 13, the answer should be negative, since the flag NIC has been held at 1 according to step 14 as noted above, and then it is determined at step 21 whether or not the flag NIC is 1. If the answer is yes, the values of the fuel injection periods TOUTM, TOUTS stored in step 17 in a loop immediately preceding the interrupted last loop are loaded into the counters 509, 509', at step 22, to start the counting operation of the counter 509 to inject fuel into the cylinder determined at steps 4–11, as well as the counting operation of the counter 509', while resuming the calculation of steps 15–17 interrupted at step 12, at step 24. The resulting calculated values of the resumed calculation are stored into the RAM 508 to supersede the previously stored calculated values, at step 25, while the flag NIC is set to 2 at step 26.

In the next loop of the program which is started upon generation of a next TDC signal pulse, the answer to the question of step 21 should be negative or no since the flag NIC was set to 2 at step 26 in the preceding loop, the calculated values obtained and stored in step 25 in the last loop are read out and loaded into the counters 509, 509' at step 27, to start the counters for starting the fuel injections at step 28. Then, the step 14 et seq. are executed to calculate the injection periods TOUTM, TOUTS (steps 14–17). If during the calculation a TDC signal pulse is generated, the steps 1, 12, and 2–13, 21–26 are executed in the same manner as stated before, whereas if no further TDC signal pulse is generated before completion of the calculation, an injection is effected in a quantity corresponding to the calculated value immediately upon completion of the calculation (steps 18–20).

What is claimed is:

1. A fuel supply control method for an internal combustion engine having a plurality of cylinders, including calculating the quantity of fuel to be supplied to said engine in response to operating conditions of said engine, and sequentially supplying quantities of fuel corresponding to the calculated values into respective corresponding ones of said cylinders, the method comprising the steps of: (a) generating pulses of a timing signal equal in number to the number of said cylinders at predetermined crank angles of said engine per one cycle of said engine; (b) calculating the quantity of fuel to be supplied to said engine, in synchronism with generation of said timing signal; (c) when a calculation started in said step (b) upon generation of an immediately preceding pulse of said timing signal is completed before a present pulse of said timing signal is generated, starting the supply of fuel in a quantity corresponding to a calculated value obtained by said calculation, immediately upon completion of said calculation; and (d) when said present pulse of said timing signal is generated before completion of said calculation started in said step (b) upon generation of said immediately preceding pulse of said timing signal, starting the supply of fuel in a quantity corresponding to a calculated value obtained by a latest calculation effected in said step (b) before the generation of said present pulse of said timing signal, immediately upon the generation of said present pulse of said timing signal.

2. A fuel supply control method as claimed in claim 1, wherein when said present pulse of said timing signal is generated before completion of said calculation started in said step (b) upon generation of said immediately preceding pulse of said timing signal, said calculation started upon the generation of said immediately preceding pulse is continually executed, while a further calculation is inhibited even with the generation of said present pulse of the timing signal.

3. A fuel supply control method as claimed in claim 2, wherein immediately upon generation of a pulse of the timing signal next to said present pulse thereof after completion of said continually executed calculation, the supply of fuel is started in a quantity corresponding to a calculated value obtained by said continually executed calculation completed.

* * * * *